United States Patent [19]

Sarem et al.

[11] 4,051,901
[45] Oct. 4, 1977

[54] PROCESS FOR WATER TREATMENT IN MOBILITY CONTROLLED CAUSTIC FLOODING PROCESS

[75] Inventors: Amir M. Sarem, Yorba Linda; Russell C. Darr, Oxnard; Dale L. Elchlepp, Santa Maria; Robert B. Spratt, Westminister, all of Calif.

[73] Assignee: Union Oil Company of California, Brea, Calif.

[21] Appl. No.: 731,777

[22] Filed: Oct. 12, 1976

[51] Int. Cl.$^2$ .................... E21B 43/22; E21B 33/138
[52] U.S. Cl. .................... 166/270; 166/244 C; 166/273; 166/292
[58] Field of Search .................... 166/244 C, 252, 270, 166/273, 274, 292, 300, 305 R, 305 D, 52, 75; 210/42 R, 74

[56] References Cited

U.S. PATENT DOCUMENTS

| 2,261,100 | 10/1941 | Erwin | 166/305 D X |
|---|---|---|---|
| 2,903,065 | 9/1959 | Holbrook et al. | 166/252 X |
| 3,136,359 | 6/1964 | Graham | 166/252 X |
| 3,515,215 | 6/1970 | Scott et al. | 166/274 |
| 3,530,937 | 9/1970 | Bernard | 166/270 |
| 3,658,131 | 4/1972 | Biles | 166/273 X |
| 3,805,893 | 4/1974 | Sarem | 166/270 |
| 3,871,452 | 3/1975 | Sarem | 166/270 |
| 3,926,255 | 12/1975 | Williams | 166/270 |

Primary Examiner—Stephen J. Novosad
Assistant Examiner—George A. Suchfield
Attorney, Agent, or Firm—Richard C. Hartman; Dean Sandford

[57] ABSTRACT

A process for recovering petroleum from subterranean reservoirs where high salt content water is used in a secondary recovery process consisting of forming as the displacement fluid a dilute alkaline silicate solution utilizing the high salt content water and filtering the alkaline flooding solution to remove scale-forming alkali insoluble salts which include a substantial proportion of calcium and magnesium salts. The filtered solution is injected into the reservoir and this is followed by an injection of a slug of substantially neutral water. A dilute acid solution is utilized to contact and dissolve the alkaline insoluble salts which have been filtered from the alkaline solution and the thus formed solution which includes a substantial portion of soluble calcium and magnesium salts is injected into the reservoir for subsequent contact with the alkaline silicate solution. This contact results in the formation of precipitates which partially plug that portion of the reservoir in which the contact occurs and reduces the permeability thereof. The process is repeated a plurality of times until the desired amount of alkaline silicate solution has been injected into the reservoir whereupon untreated water can be injected as a drive fluid.

20 Claims, 1 Drawing Figure

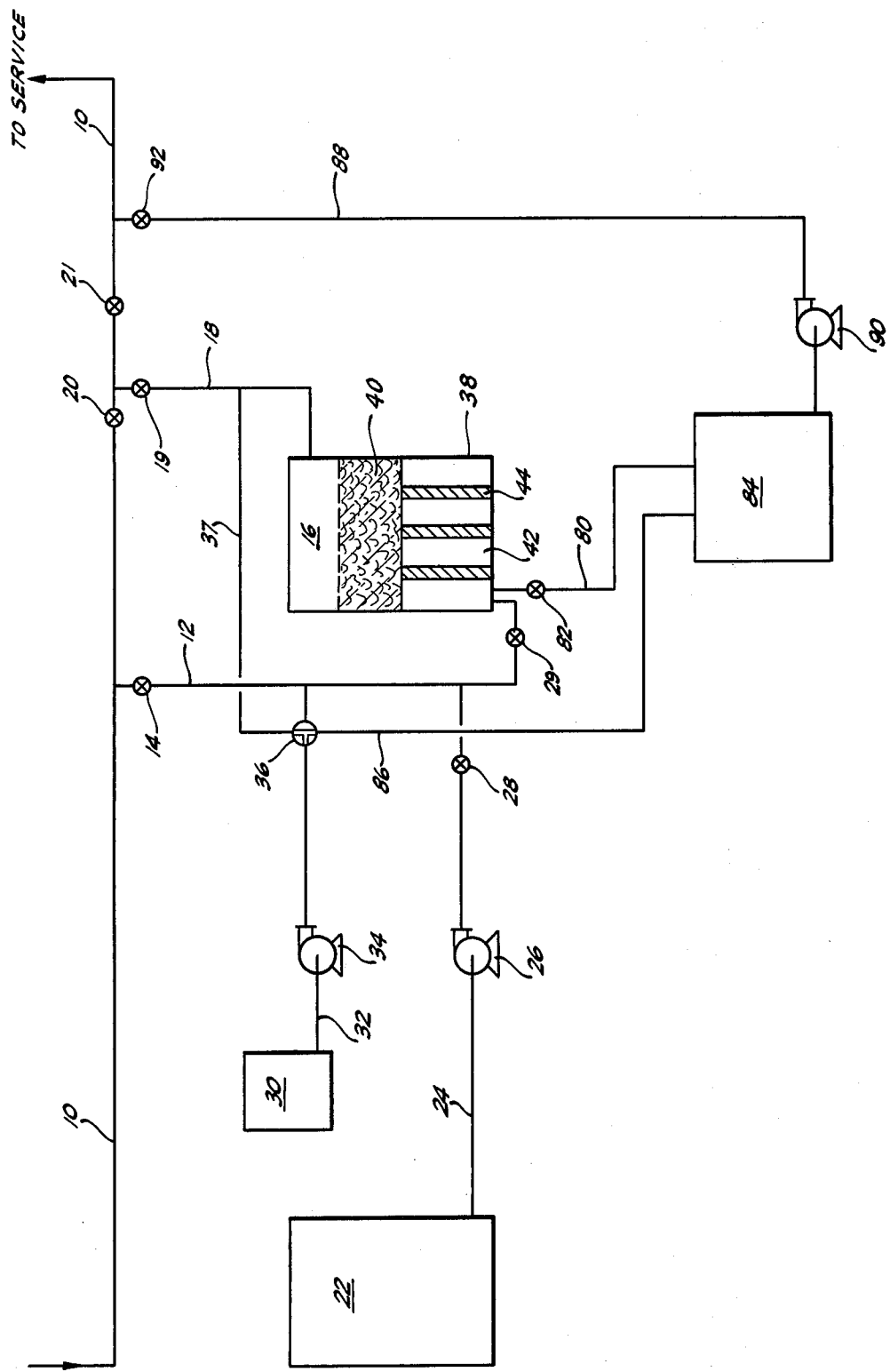

PROCESS FOR WATER TREATMENT IN MOBILITY CONTROLLED CAUSTIC FLOODING PROCESS

BACKGROUND OF THE INVENTION

This invention relates to water treatment processes and more particularly to the treatment of alkaline aqueous solutions used in secondary petroleum recovery processes.

In the recovery of petroleum from subterranean reservoirs it is usually advantageous to employ a driving fluid to enhance the displacement of the reservoir petroleum and to move it toward one or more production wells for subsequent recovery and processing. These displacement fluids are normally comprised, wholly or in part, of water, typically water produced from or readily available at the well site. It is also highly desirable that the pH of the displacement fluid be maintained on the alkaline side so that the interfacial tension between the reservoir oil and the displacement fluid is reduced and the displacement efficiency is substantially improved.

The water most readily available for use as the displacement fluid or injection water normally has a substantially high concentration of total dissolved salts, particularly magnesium and calcium salts. A serious problem with any hard water, and particularly with injection water, is that insoluble precipitates are formed which rapidly deposit as scale on pump parts and within the pipelines. The formation of these deposits, which is referred to as scaling, requires periodic acid washing to remove the deposits. Failure to properly remove the deposits can result in the malfunctioning and the shortening of the useful life of the components of a water-handling system, such as the pumps and lines.

Needless to say, in many situations the water can be softened or demineralized in order to remove the insoluble precipitate precursors and thus largely eliminate the scaling problem. In the case of the handling or treatment of large volumes of water, however, such as is encountered in connection with petroleum recovery processes and the like, the volume of water renders conventional softening or demineralization processes uneconomical. There is also a problem of the disposal of the brine liquors or precipitates which are normally produced in the course of conventional water-treatment processes. In addition many of the salts present in the water to be used in oil recovery processes, such as sodium chloride, are beneficial to the process and their removal along with the scale forming precursors would not be desirable.

Consequently, it would be highly advantageous to provide a process in which alkaline aqueous solutions are treated to reduce their scaling tendencies and the waste product of the treatment process placed in a form for underground disposal. Additionally, it would be highly advantageous to provide a process for the treatment of water to reduce its scaling tendencies which process can be utilized in conjunction with a caustic flooding process in which precipitated solids are redissolved and utilized to control the mobility of the displacement fluid in the reservoir.

SUMMARY OF THE INVENTION

Briefly the present invention resides in the process for the treatment of alkaline aqueous solutions prior to their injection into a petroleum reservoir in a mobility controlled caustic flooding process to precipitates and collect the alkaline insoluble salts and thus reduce scaling caused by the precipitation of dissolved salts from the alkaline solution. The collected precipitates are subsequently solubilized and injected into the reservoir to contact the alkaline solution and to form in situ precipitates in the reservoir for the purpose of selectively reducing the permeability of the reservoir.

More particularly, the alkaline aqueous solution is formed and held for a sufficient period of time to initiate flocculation and precipitation of the alkaline insoluble scale-forming precursors. The alkaline solution is then passed through a filter to remove the alkaline insoluble precipitates prior to injection of the alkaline solution into the reservoir. Following the injection of the alkaline aqueous solution, an aqueous solution of the alkaline insoluble precipitates is formed by contacting the precipitates with an aqueous acid solution to effect the dissolution thereof. The solubilized precipitate solution is injected into the reservoir and intermixes with the previously injected alkaline solution. The pH of the resultant mixed solutions is sufficiently high to result in the in situ reformation of the alkaline insoluble precipitates which partially plug the pores of the reservoir in the area in which they are formed. In this manner the areal and vertical sweep efficiencies are improved and oil recovery efficiency is enhanced. In addition, scaling of pump parts and pipelines and the like is substantially reduced resulting in increased useful life for the components of the flooding process.

Other advantages and features of the present invention reside in the reduction in the proportion of scaling precursors without substantially affecting the concentration of certain dissolved electrolytes, the presence of which are beneficial. Also, the problem of disposal of the scaling precursors is eliminated by their use in the process while at the same time the necessity of purchasing additional chemicals to form a solution which will form the in situ precipitates is avoided. Other advantages and features of the present invention will become apparent from the following detailed description in conjunction with the drawing.

BRIEF DESCRIPTION OF THE DRAWINGS

The FIGURE is a flow diagram of an embodiment of the present invention.

DESCRIPTION OF THE INVENTION

In accordance with the present invention alkaline aqueous liquids are treated prior to injection into a petroleum reservoir to reduce or eliminate scaling in pumps, lines and the like which are contacted by the aqueous alkaline liquids. Scaling is the result of the precipitation of at least a portion of the alkaline insoluble salts contained in the aqueous fluids, which results in the formation of tough adherent deposits which can plug lines and cause malfunction of pumps and other equipment engaged in the oil recovery process. The present invention is particularly useful in the mobility controlled caustic flooding process (MCCF) for the secondary treatment of petroleum deposits to recover petroleum therefrom.

Basically the MCCF process is a process for the recovery of oil from a subterranean petroleum reservoir wherein a precipitate is selectively formed in the reservoir for the purpose of controlling the mobility of the alkaline displacement fluid in the reservoir. In carrying out the MCCF process alternate slugs of a dilute aqueous alkali metal silicate solution and a dilute aqueous solution of an agent that reacts with the alkali metal silicate to form a gelatinous precipitate are injected into the reservoir through one or more injection wells. The alkaline solution serves to displace the reservoir oil for recovery from one or more production wells and the alkalinity of the silicate solution serves to reduce the interfacial tension between the displacement fluid and the reservoir oil thereby improving displacement efficiency. The silicate reacts with the subsequently injected agent, usually a high calcium-containing liquid, to form a gelatinous precipitate which serves to decrease the porosity of the reservoir in the area where the gelatinous precipitate is formed. Normally this will result in reducing the permeability of the more permeable areas of the reservoir since these are the areas through which the alkaline silicate solution and the subsequently injected agent solution will most readily flow. By partially plugging these highly permeable areas subsequently injected displacement fluid is forced to flow through less permeable areas of the reservoir thereby increasing the vertical and areal sweep efficiency of the displacement fluid. Several embodiments of the MCCF process are described in U.S. Pat. No. 3,805,893, Sarem and 3,871,452, Sarem and the description of the MCCF process and its manner of operation contained in those patents is incorporated by reference herein.

The alkaline silicate solution used as the displacement fluid is an aqueous solution of an alkali metal silicate, with sodium or potassium silicate being preferred. Good results are achieved with most crude oils when the solution comprises between about 0.01 wt.% and 0.8 wt.% of the alkaline, alkali metal silicate and preferably between about 0.05 to about 0.3 wt.%. The pH of the alkaline silicate solution may vary depending upon the nature of the crude oil and the reduction in interfacial tension required in order to maximize the displacement efficiency of the displacement fluid. Broadly the pH may range between about 9 and about 13 and good results are achieved with a pH range of between about 10 and about 12, with a pH of on the order of 12 being preferred. Solutions having pH's in excess of about 13 are difficult and uneconomical to achieve and are not believed to provide any significant increase in displacement efficiency over solutions having pH's of 13 and below.

Another important factor in the selection of the alkali metal silicate is the molar ratio between the alkali metal oxide ($M_2O$) and silica ($SiO_2$) of the aqueous alkaline solution. Preferably the $M_2O/SiO_2$ ratio is 1 or greater and best results are achieved when the molar ratio is on the order of about 2.

Exemplary of the alkali metal silicates employed in the practice of this invention are water soluble silicates such as the alkali metal orthosilicates, alkali metal metasilicates, alkali metal metasilicate pentahydrates and alkali metal sesquisilicates. In certain cases the $M_2O/SiO_2$ ratio of the aqueous silicate solution will be below 1 and the resultant pH of the solution will also be low. In such a case the $M_2O/SiO_2$ molar ratio and the pH of the solution are readily adjusted by the addition of a caustic material to the aqueous solution. Preferably the caustic material will be the hydroxide of the same alkali metal as the alkali metal silicate. Thus, when using sodium silicate, the preferred caustic is sodium hydroxide.

The water used to form the aqueous alkaline silicate solution may be fresh water or more typically is water which contains dissolved salts. In view of the large amounts of water required, waters produced or readily available at the well site are preferred for use and even though these waters normally contain substantial proportions of dissolved salts, good results are achieved since the salts are not believed to interfer with the oil recovery process. In fact the presence of certain electrolytes, such as sodium chloride, are highly desirable and are added to the water if not initially present in sufficient proportions. These waters, however, also can contain substantial proportions of dissolved alkaline insoluble salts, particularly calcium, magnesium and bicarbonate salts that, at the elevated pH employed in flooding processes, will form insoluble salts which can precipitate and form scale in the pipeline and on other apparatus and components used in the flooding process. Depending upon the salt content of the makeup water, a substantial proportion of the precipitates formed will comprise calcium carbonate, magnesium carbonate, magnesium hydroxide, and calcium hydroxide. Calcium and magnesium silicates may also be present in the scale forming precipitate.

In accordance with the present invention the aqueous silicate solution is filtered to remove a substantial portion of the alkaline insoluble precipitates thus reducing the tendency of the alkaline silicate solution to form scale. Prior to the filtration step, it is preferred that the solution be held for sufficient time to permit the development of the alkaline insoluble precipitate so as to enhance the filtration of the solution. The period of time necessary to develop the precipitate will vary with the salt content of the makeup water and with the filter design. Flow rates and filter designs are established utilizing factors well-known in the art to achieve the growth of sufficiently large precipitate particles for effective filtration from the aqueous silicate solution.

It is highly preferred that the precipitates comprise a substantial portion of calcium and magnesium carbonate as the carbonates are readily solubilized in acid solutions. Typically, calcium and magnesium carbonate are formed as a result of the reaction between the calcium and magnesium ions and the bicarbonate ions of the makeup water. Thus, if the bicarbonate content of the makeup water is less than the stoichiometric amount required to react with the calcium present in the water to form calcium carbonate, bicarbonate, such as sodium bicarbonate can be added to bring the bicarbonate concentration up to the desired level.

After filtration the alkaline silicate solution is injected into the reservoir as the petroleum displacement fluid. The alkaline silicate injection cycle is followed by the injection of a solution containing an agent which reacts in the presence of the silicate solution to form a precipitate. The precipitate forming agent is normally a soluble calcium salt, such as calcium chloride, which under alkaline conditions reacts with the alkali metal silicate to form a gelatinous precipitate. Other agents such as magnesium and barium soluble salts which will form either alkaline insoluble silicates or other alkaline insoluble precipitates are also useful and may be used alone or in combination with the calcium salt. A slug of neutral water is normally interposed between injections of the silicate solution and the precipitate-forming agent solution to serve as a spacer between the two solutions. Subsequent to their injection into the reservoir, the two solutions intermix and form in the reservoir a precipitate which serves to reduce the porosity of the reservoir formation and thus divert subsequently injected fluids to other strata.

The precipitate-forming agent solution is prepared in accordance with the invention by solubilizing the alkaline insoluble material from the silicate solution in a dilute aqueous solution of an acid. The solution is injected into the reservoir for subsequent contact and reaction in the reservoir with the already injected alkaline silicate solution to reduce the permeability of a portion of the reservoir in the contact area. In addition, solubilization of the alkaline insoluble material with the dilute acid solution serves to clean the separation equipment and filters in preparation for a subsequent alkaline silicate solution cycle as described above.

Typically, the acid solution is prepared from a more concentrated solution of acid which is admixed with the injection water prior to its passage through the separation equipment. The acid strength of the dilute acid solution should at least be equivalent to the stoichiometric amount of acid required to solubilize the alkaline insoluble material. However, the acid solution should not be so strong as to be corrosive to the pumps and lines or so weak as to tend to form scale in the pump and lines with which it may come in contact. In view of the conditions typically encountered using production water or water readily available at the well site to form the dilute acid solution, a convenient measure of the solution strength, with respect to its tendency to corrode or to form scale, is afforded by the Langelier saturation index (SI) which is determined according to the relationship:

$$SI = pH - pCa - pAlk - C, \text{ where}$$

pH is the pH of the sample water;
pCa is the negative logarithm of the calcium concentration of the sample water;
pAlk is the negative logarithm of the total alkalinity of the sample water; and
C is a constant which depends on the total salt content and temperature of the water.

An aqueous solution having an SI of O is substantially neutral, that is it is neither corrosive nor does it tend to deposit calcium carbonate scale. An increasingly positive SI indicates increasing scaling tendency while an increasingly negative SI indicates increasing corrosiveness. Preferably the dilute acid solution is adjusted so that its SI is ± 0.35. Most preferably the SI of the acid solution is 0.

The choice of acid utilized for the step of dissolving the precipitate is not critical and is largely dependent on the composition of the precipitate as well as the cost and availability of acid. Thus, those acids which are sufficiently active to attack the precipitate and which form salts which can be solubilized are suitable for use. In the typical application of the present invention the precipitates to be dissolved will largely comprise calcium and magnesium salts. Consequently it is highly preferred to utilize acids such as hydrochloric, nitric, and iodic, which are highly reactive in dissolving the precipitate and which form highly soluble calcium and magnesium salts. Likewise certain organic acids such as acetic and formic acids are also sufficiently reactive to dissolve the precipitate and form highly soluble salts with calcium and magnesium. Sulfuric acid, hydrofluoric and phosphoric acid are less preferred since the salts formed are only slightly soluble or insoluble in water.

In carrying out the MCCF process the duration of each of the injection cycles will vary depending on the makeup of the injection water, the solution strengths, flow rate and similar factors which are well understood in the art. Preferably the solutions are injected at conventional floodwater injection rates, for example between about 100 to 2000 barrels per day and the alkaline silicate solution may be injected for a period of between about 1 hour to about 7 days. The injection rate of the precipitate forming agent solution is likewise adjusted so that sufficient dissolved calcium and magnesium are available to stoichiometrically react with the silicate to form the calcium silicate precipitate in the reservoir, and may also range from between about 1 hour and about 7 days depending upon flow rates, solution strength and the like. The spacer water injected between the slugs of aqueous alkaline silicate solution and the precipitate forming agent solution is injected in a smaller volume, sufficient to effect separation between the two solutions so precipitate formation as a result of contact between the solutions is avoided in the area of the reservoir immediately surrounding the injection well.

Referring to the FIGURE, there is shown a flow sheet of an embodiment of the invention employed in connection with the MCCF flooding process. A line 10 communicates with a source of injection water and with a manifold, not shown, for distribution of liquid to one or more injection wells for injection into the reservoir. A line 12 provided with a valve 14 communicates between the line 10 and a filter 16 for the introduction of influent into the filter and an effluent line 18 provided with a valve 19 communicates with the line 10 between a pair of valves 20 and 21 provided in the line 10.

A storage tank 22 communicates with the line 12 through a line 24 in which are disposed a pump 26 and a valve 28. Similarly, an acid storage tank 30 communicates with the line 12 through a line 32 in which are disposed a pump 34 and a 3-way valve 36. The line 32 also communicates with the line 18 through the 3-way valve 36 and a line 37 for the bypass of the acid solution from the tank 30 around the filter 16 for purposes to be discussed below.

The filter 16 is of conventional design and includes a vessel 38 in which is disposed a graded sand and gravel filter bed 40 in spaced relation to the floor of the vessel so as to define a precipitate development zone 42 therebetween. The filter bed 40 is supported in the vessel 38 by a plurality of spacers 44, the upper ends of which carry a screen, not shown, for supporting the filter bed 40.

During the alkaline silicate injection cycle of the process, the valve 20 is closed and the valve 14 is opened so that the flow of injection water is through the line 10 into the line 12 to enter the filter in the precipitate development zone 42. The flow continues upwardly through the filter bed 38, the line 18 and the valve 19 for return to the line 10 and service. Concentrated alkaline silicate solution from the tank 22 is pumped through the line 24 by the pump 26 and is metered into the injection water in the line 14 prior to entering the filter 16. The dilute alkaline silicate solution enters the filter at the precipitate development zone 42 where, by regulation of the flow rate, sufficient residence time is provided for the formation and precipitation of a substantial portion of the alkaline insoluble material which is formed as a result of the raising of the pH of the injection water by contact with the alkaline silicate solution. The dilute alkaline silicate solution is then passed upwardly through the filter bed 38 where the solution is filtered to remove additional alkaline insoluble material. The filtered solution exits the filter 16 through the line 18 and is returned to the line 10 and thence to the injection wells.

The alkaline silicate solution is injected into the reservoir for a predetermined period or cycle, following which the pump 34 is activated and acid pumped from the tank 30 through the line 32 and the 3-way valve 36 is positioned so that the flow of the acid solution is into the line 37 and thence into the line 18 for mixing with the alkaline dilute silicate solution in the line 18. The acid is pumped at a sufficient rate to substantially neutralize the filtered alkaline silicate solution and the resultant neutral mixture enters the line 10 and is injected into the reservoir as spacer water.

After introduction of the spacer water, the silicate pump 26 is deactivated, the valve 28 is closed and the 3-way valve 36 is positioned so that the acid solution from the tank 30 is pumped by the pump 34 through the line 32 for metering into the injection water in the line 12 to form the dilute acid solution. The dilute acid solution is led into the filter 16 where the alkaline insoluble precipitate in the development zone 42 and the filter bed 38 is solubilized. The acid solution, which contains the acid soluble/alkaline insoluble material, exits the filter 16 through the line 18 and is returned to the line 10. The rate of metering is adjusted so that the SI of the resultant mixture of the injection water and the acid solution is substantially neutral. The acid solution/injection water mixture is introduced into the reservoir as the precipitate forming agent solution subsequent contact with the alkaline silicate solution in accordance with the MCCF process. A slug of neutral spacer water prepared as already described is injected following the injection of the precipitate forming agent solution and the entire process is repeated.

An alternate form of the process involves adapting the filter 16 for backwashing with the injection water to remove the filtrate from the filter bed 38 along with the contents of the development zone 42 to a separate receiving tank. The backwash liquid is then contacted with the acid solution to solubilize the precipitate for subsequent use as the precipitate forming agent solution.

Referring to the figure, a line 80 is provided with a shutoff valve 82 and leads from the lower portion of the filter 16 to a backwash liquid-holding tank 84. The holding tank 84 may be provided with suitable mixing and stirring equipment, not shown. A line 86 communicates between the line 32 through the 3-way valve 36 and the holding tank 84 for contacting the contents of the backwash holding tank with the acid solution. A line 88 provided with a pump 90 and a shutoff valve 92 communicates between the backwash liquid holding tank 84 and the line 10 for metering the solubilized contents of the filter 16 into the injection water to form the precipiate forming agent solution. The filter is backwashed by closing the valve 21, temporarily interrupting the flow of injection water to service through the line 10, while the valve 20 and 19 are opened to permit the flow of fluid through the line 18 into the filter 16. The backwash liquid exits the filter through the line 80 and into the tank 84 where it is held for a subsequent contact with the acid solution. Once backwashing has been completed the valve 21 is opened and the valve 19 is closed to reestablish flow through the line 10 to service.

This invention is further illustrated by the following examples whih are illustrative of specific modes of practicing the invention and are not intended as limiting the scope of the invention as defined by the appended claims.

EXAMPLE

The process of this invention is further demonstrated utilizing the mobility controlled caustic flooding process where scaling of the pipelines and related equipment is a serious problem.

In the process, the displacement fluids are injected into the reservoir through 8 injection wells which are arranged as two spaced apart rows 4 wells each. Eleven production wells aligned roughly in 3 rows are disposed between the spaced rows of injection wells. Suitable piping and headers are provided for distributing the displacement fluids to the injection wells and recovering fluids from the production wells. The arrangement of the various vessels and lines utilized in process for the treatment and handling of the displacement fluids is as illustrated in the figure and described above.

The injection water utilized has a pH of about 8.1 and a substantially high salt content as set forth below:

$HCO_3^-$ 537 ppm
$CO_3^-$ 76 ppm
$Cl^-$ 8770 ppm
$SO_4^-$ 75 ppm
$Na^+$ 5300 ppm
$Mg^{++}$ 229 ppm
$Ca^{++}$ 275 ppm
$Ba^{++}$ 24 ppm
TDS 16,591 ppm A concentrated (8 wt.%) solution of alkaline sodium silicate is prepared by dissolving about 3.8 parts per hundred of low alkalinity sodium silicate ($Na_2O/SiO_2$ molar ratio of 0.3) and about 4.3 parts per hundred of sodium hydroxide in 3,415 bbls. of water which has been passed through a cation exchange resin to reduce the calcium and magnesium content. The concentrated solution is maintained in the silicate storage tank 16. The concentrated silicate solution is mixed with the injection water to form an alkaline injection solution comprising 2460 ppm of NaOH and 2160 ppm of sodium silicate, having an $Na_2O/SiO_2$ molar ratio of about 2 and a pH of about 12.2. Proper mixing is accomplished by introducing the concentrated solution at the rate of about 100 bbls. per hour into the stream of injection water which is flowing at the rate of about 1670 bbls. per hour. After formation of the dilute alkaline silicate solution, it is led into a graded sand filter where the precipitate, containing a substantial proportion of scale forming calcium carbonate which precipitates as a result of the elevation of the pH of the injection water, is filtered out of the alkaline silicate solution. After filtration the silicate solution is injected into the reservoir. The alkaline silicate injection cycle is maintained for 15 hours following which the alkaline silicate solution flowing from the filter is neutralized with hydrochloric acid and injected into the well as spacer water. The injection of spacer water is carried out for one hour.

Following injection of the spacer water, the flow of concentrated silicate solution is stopped and a 35% hydrochloric acid solution is admixed at the rate 1.5 barrels/hr. with the injection water and passed through the filter to dissolve the precipitate contained in the filter. In this manner the precipitate in the filter is removed and the filter cleaned for subsequent filtration. The calcium and magnesium containing solution thus formed is injected into the reservoir for the formation of in situ calcium and magnesium silicate precipitates for the control of reservoir permeability in accordance with the MCCF process. Based on the calcium and magnesium content of the injection water, 10,072 lbs. of hydrochloric acid are required to dissolve the precipitate over a 7-hour period.

After the acid wash of the filter has been completed, an additional 1-hour injection of substantially neutral spacer water formed as described above is introduced into the reservoir. Upon completion of the second spacer water injection the cycle of alkaline silicate injection followed by injection of calcium-containing water is repeated. A summary of the cycles and the injection periods is set forth below:

| Material Injected | Injection Time/Hours |
|---|---|
| Sodium silicate solution | 15 |
| Spacer Water | 1 |
| High calcium solution | 7 |
| Spacer Water | 1 |

The alternate injections are continued until 0.2 pore volume of high pH fluid has been introduced into the reservoir. At this point ordinary injection water is introduced into the reservoir as in conventional waterflooding techniques. Fluids are recovered at the production wells and processed in the conventional manner.

From the foregoing it can be seen how the advantages of the method of the present invention are achieved, particularly with regard to its use with mobility controlled caustic flooding processes where the cause of scaling is substantially eliminated and the cost of chemicals reduced by the use of the alkaline insoluble precipitates. Moreover, disposal of the precipitate is readily accomplished by solubilization and use of the precipitate cations, particularly calcium and magnesium in the flooding process to control reservoir permeability.

We claim:

1. A process for recovering petroleum from a subterranean reservoir penetrated by an injection well and a production well spaced apart in the reservoir which comprises alternately injecting into the reservoir through the injection well for a selected time period a petroleum displacement fluid comprising a dilute alkaline aqueous solution of an alkali metal silicate and thereafter injecting for a selected time period a dilute aqueous precipitate-forming solution of a material that reacts with the alkali metal silicate to form a precipitate, said alkali metal silicate solution further containing alkaline insoluble, scale forming salts comprising cations which form insoluble silicates, the improvement comprising:
   a. separating said alkaline insoluble salts from said dilute aqueous alkali metal silicate solution prior to the injection of said solution into the reservoir thereby to reduce the scaling tendency of said alkaline alkali metal silicate solution;
   b. contacting said alkaline insoluble salts with a dilute aqueous acid solution to dissolve said salts and to form a precipitate-forming solution comprising said cations which form insoluble silicates; and
   c. injecting into said reservoir said solution of step b subsequent to the injection of said alkaline alkali metal silicate solution where by contact between the solutions results in the formation of precipitate and the reduction of reservoir permeability in the area of contact.

2. The process of claim 1 wherein substantially neutral water is injected into the reservoir as a spacer between injection of said petroleum displacement fluid and said precipitate-forming solution.

3. The process of claim 1 wherein said alkaline insoluble salts are separated from said aqueous alkali metal silicate solution by filtration.

4. The process of claim 1 wherein said alkaline insoluble salts comprise the salts of the alkaline earth metals.

5. The process of claim 1 wherein said dilute aqueous alkaline alkali metal silicate solution comprises between about 0.01 wt.% and about 0.8 wt.% of alkali metal silicate and is prepared by diluting a more concentrated aqueous alkali metal silicate solution with water and subsequently passing said dilute solution through a filter to remove alkaline insoluble salts.

6. The process of claim 5 wherein the water used to form the dilute alkaline alkali metal silicate solution contains alkaline insoluble calcium and magnesium salts.

7. The process of claim 1 wherein said dilute aqueous acid solution comprises at least the stoichiometric amount of acid to solubilize the separated alkaline insoluble salts.

8. The process of claim 1 wherein said dilute acid solution comprises an acid which forms water soluble salts with calcium and magnesium.

9. The process of claim 1 wherein said alkaline alkali metal silicate solution is injected into the reservoir over a period ranging from between about 1 hour and about 7 days said precipitate-forming solution is injected into the reservoir over a period ranging from between about 1 hour and about 7 days.

10. The process of claim 9 wherein a spacer of substantially neutral water is injected into the reservoir between the injection of said alkaline alkali metal silicate solution and said precipitate-forming solution.

11. A process for recovering petroleum from a subterranean reservoir penetrated by one or more injection wells and one or more production wells spaced apart from said injection well, said process comprising the steps of:
   a. mixing an alkaline alkali metal silicate solution with water containing calcium and magnesium alkaline insoluble salts to form a dilute aqueous alkali metal silicate solution having a pH of between about 9 and about 13 and an alkali metal oxide/silica ratio of at least about 1;
   b. passing said dilute aqueous alkali metal silicate solution through a filter to remove and recover the alkaline insoluble calcium and magnesium salts which have precipitated from said solution;
   c. injecting said filtered alkali metal silicate solution into said reservoir through at least one of said injection wells for a pre-selected period of time;
   d. thereafter injecting substantially neutral water for a pre-selected period of time;
   e. dissolving said alkaline insoluble calcium and magnesium salts with a dilute acid solution thereby to form an aqueous solution comprising calcium and magnesium;
   f. injecting said solution comprising calcium and magnesium into said reservoir for a pre-selected period of time;
   g. injecting neutral water for a selected period of time;
   h. repeating steps a–g a plurality of times; and
   i. recovering fluids from said production well.

12. The process of claim 11 wherein said dilute alkali metal silicate solution comprises between about 0.01 and about 0.8 wt.% of said alkali metal silicate.

13. The process of claim 11 wherein said alkali metal silicate is sodium silicate.

14. The process of claim 11 wherein said dilute aqueous alkali metal silicate solution has a pH of between about 10 and about 12.

15. The process of claim 14 wherein said alkali metal silicate solution has a pH of about 12.

16. The process of claim 11 wherein said dilute aqueous alkali metal silicate solution has an alkali metal oxide/silica molar ratio of 2.

17. The process of claim 11 wherein the acid concentration of said dilute aqueous acid solution is at least the stoichiometric amount of acid required to dissolve said alkaline insoluble salts.

18. The process of claim 11 wherein said preselected period of time for injecting said filtered dilute aqueous silicate solution and said solution comprising calcium and magnesium salts ranges from between about 1 hour to about 7 days.

19. The process of claim 11 wherein said filtered dilute alkaline alkali metal silicate solution is first injected into the reservoir for 15 hours followed by the injection of substantially neutral water for a period of 1 hour, then said solution comprising calcium and magnesium is injected into said reservoir for a period of 7 hours followed by a 1-hour injection of substantially neutral water.

20. The process of claim 11 wherein steps a–g are repeated until about 0.2 pore volumes of alkaline alkali metal silicate solution has been injected into said reservoir.

* * * * *